Dec. 23, 1969     C. I. BOKSJO     3,486,103
THYRISTOR RECTIFIER COMPRISING SERIES CONNECTED THYRISTORS
OF ALTERNATELY PNPN AND NPNP TYPE
Filed Dec. 30, 1966

INVENTOR.
CARL INGVAR BOKSJO
BY
Bailey, Stephens & Huettig
ATTORNEYS

United States Patent Office 3,486,103
Patented Dec. 23, 1969

3,486,103
THYRISTOR RECTIFIER COMPRISING SERIES CONNECTED THYRISTORS OF ALTERNATELY PNPN AND NPNP TYPE
Carl Ingvar Boksjo, Ludvika, Sweden, assignor to Allmanna Svenska Elektriska Aktiebolaget, Vasteras, Sweden, a Swedish corporation
Filed Dec. 30, 1966, Ser. No. 606,303
Claims priority, application Sweden, Dec. 30, 1965, 16,955/65
Int. Cl. H02m 7/04
U.S. Cl. 321—8
2 Claims

ABSTRACT OF THE DISCLOSURE

A rectifier composed of alternate PNPN and NPNP thyristors, each pair of which are mounted on a common conducting base plate to which the cathode and anode sides respectively of the thyristors of each pair are connected; the plates may be provided with cooling means; the control electrodes of two adjacent transistors are connected together to a control voltage source.

The present invention relates to a thyristor rectifier for high voltage converters.

When using thyristors for high voltage converters a great number of thyristors are connected in series in order to achieve sufficiently high blocking and inverse voltages in the converter. Compared with converters using mercury arc rectifiers, therefore, each mercury arc rectifier will be replaced by a chain of series-connected thyristors. Such a chain of thyristors with their auxiliaries is caller a thyristor rectifier.

The various thyristors in a thyristor rectifier will have different potentials and must therefore be well insulated from each other. This must be taken into account both during mounting of the thyristors and when cooling them which may for example be done by liquid cooling, the coolant in this case being led in insulating channels from one thyristor to the next. The control circuits of the thyristors must also be insulated from each other. With the large number of thyristors, the number of auxiliary components will also be large and the construction of a thyristor rectifier is therefore rather complicated. The present invention provides an important simplification in the construction of such thyristor rectifiers.

In the construction of thyristor rectifiers only one type of thyristor, for example PNPN-thyristors, has previously been used, this being at present the most usual, or only NPNP-thyristors. According to the invention it is now proposed to use both PNPN-thyristors and NPNP-thyristors and a thyristor rectifier according to the invention is characterised in that the thyristors in the thyristor-rectifier are alternately of PNPN and NPNP type and the thyristors are arranged in pairs on common base plates so that in a pair of thyristors the cathode side of a thyristor of one category and the anode side of a thyristor of the other category are attached to the common plate. Each pair of thyristors will in this way form a unit and the number of units in a thyristor rectifier will thus be halved and the mounting of the rectifiers therefore simplified. In the same way the number of auxiliary components will be halved, or at least limited, and the whole rectifier will therefore be simpler and cheaper. For example said base plates can be used as cooling flanges for the corresponding thyristors, so that the number of insulating cooling connections between the units is halved. It may even be possible during manufacture of the thyristors to make double thyristors built together as one unit.

Figure 1:
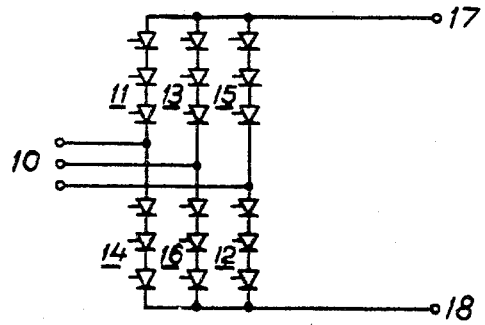
Figure 2:
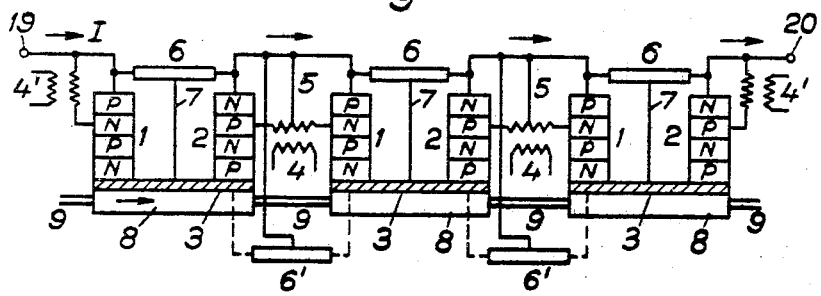
Figure 3:
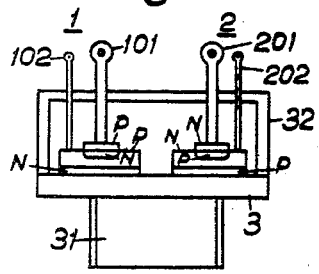
Figure 4:
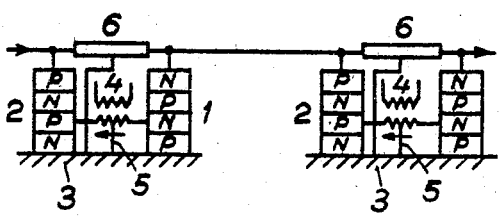

The invention will be further described with reference to the accompanying drawings, where FIGURE 1 shows a rectifier connection for a converter, while FIGURES 2 and 4 show thyristor chains according to the invention. FIGURE 3 shows how a pair of thyristors according to the invention can be built together as a double thyristor with common casing and common base plate.

FIGURE 1 shows a rectifier connection consisting of six rectifier branches 11–16, where each branch is built up of a number of series-connected thyristors which together form a thyristor rectifier. The rectifier connection is connected to AC terminal 10 and DC terminals 17 and 18.

FIGURE 2 shows a thyristor rectifier according to the invention, in the case shown comprising only six thyristors. Alternate thyristor rectifiers 1 are NPNP-thyristors and alternate thyristors 2 are PNPN-thyristors. The thyristors are arranged on common base plates 3 which also form electrical connections between the two thyristors. In connection with each base plate 3 is arranged a cooling casing 8, which cooling casings are internally joined by means of insulating conduits 9 for a coolant. The conducting direction for the thyristor current I is indicated by the upper arrows. Along the thyristor chain is arranged a voltage divider consisting of voltage divider element 6 or 6', built up of capacitive and resistive elements and connected to output terminals for the corresponding pair of thyristors or between the base plates for these. To ensure the voltage distribution between the two thyristors in a pair, the middle of the voltage divider element 6 has, by means of cross-connections 7, been connected to the base plates 3. When the voltage divider element 6' is connected between the base plates, the middles of these are connected to the connections between the corresponding two pairs of thyristors.

It is seen that each thyristor rectifier 2 in one pair has the same potential on its control path as the rectifier 1 in the subsequent pair. The invention thus has the advantage that two such adjacent thyristors can be provided with a common control device 4, for example built up as a transformer, the primary side of which is connected to a control pulse generator not shown while the secondary side is connected between the control electrodes for the corresponding two thyristors. It is also possible to connect the middle of the secondary winding in the control voltage device to the connection between the end electrodes for the corresponding two thyristors. It is also seen that the two end thyristors in the thyristor rectifier must each be provided with its own control device 4'. Alternatively, the thyristor chain may have single thyristors at the ends.

In FIGURE 2 only six thyristors have been shown between the end connections 19 and 20. In fact a thryistor rectifier for high voltage often comprises some hundred or hundreds of series connected thyristors so that the gain by halving the number of connection components and control components is considerable according to the invention.

FIGURE 3 shows schematically how two thyristors 1 and 2 can be built together as a double thyristor with a common base plate 3, possibly provided with a mounting bolt 31. The figure shows purely symbolically the distribution of N and P layers in the two thyristors and their main electrodes 101 and 201 and control electrodes 102 and 202. The thyristors are hermetically enclosed in an insulating casing 32 through which said electrodes are passed. FIGURE 3 should be considered only as suggesting a principle. In fact, for such a combination, one would probably completely reconstruct the rectifier.

FIGURE 4 shows two thryistor pairs according to the invention where it is chosen to cool the control side of the thryistors. In this way two combined thyristors 2 and 1 will also have a common control transformer 4.

The voltage dividers 6 in this case have also been arranged above the thyristor pair. In this way a thyristor pair with all its auxiliaries will form a unit connected to the adjacent unit only by the main conductors and the cooling conduits.

I claim:

1. Thyristor rectifier comprising a plurality of series connected units; each unit comprising two thyristors and a common base plate for said two thyristors; one of said thryistors being of PNPN type, the other being of NPNP type; one of said thyristors being mounted wtih its anode facing said base plate, the other with its cathode facing the base plate; said base plate electrically connecting said anode and cathode of the two thyristors; means connecting all said units in series including means connecting a free cathode of a thyristor in one unit with a free anode of a thyristor in the adjacent unit; a common control voltage source connected to the control electrodes of a thyristor from one unit and a thyristor from the adjacent unit, which two thyristors are connected to each other through a free cathode and anode respectively.

2. Thyristor rectifier as claimed in claim 1, said base plates including cooling means for the corresponding pairs of thyristors.

References Cited

UNITED STATES PATENTS

| 2,847,623 | 8/1958 | Thornhill | 317—234 |
| 3,122,695 | 2/1964 | Meissen | 321—27 X |
| 3,275,921 | 9/1966 | Fellendorf et al. | 321—8 |
| 3,333,163 | 7/1967 | Wislocky | 317—234 |
| 3,257,566 | 6/1966 | White. | |
| 3,267,290 | 8/1966 | Diebold | 321—110 XR |

LEE T. HIX, Primary Examiner

W. H. BEHA, Jr., Assistant Examiner

U.S. Cl. X.R.

317—234, 235; 321—11, 27